Oct. 20, 1931.  C. H. HOLLAND  1,828,187
CAKE TURNER
Original Filed Sept. 25, 1929  2 Sheets-Sheet 1
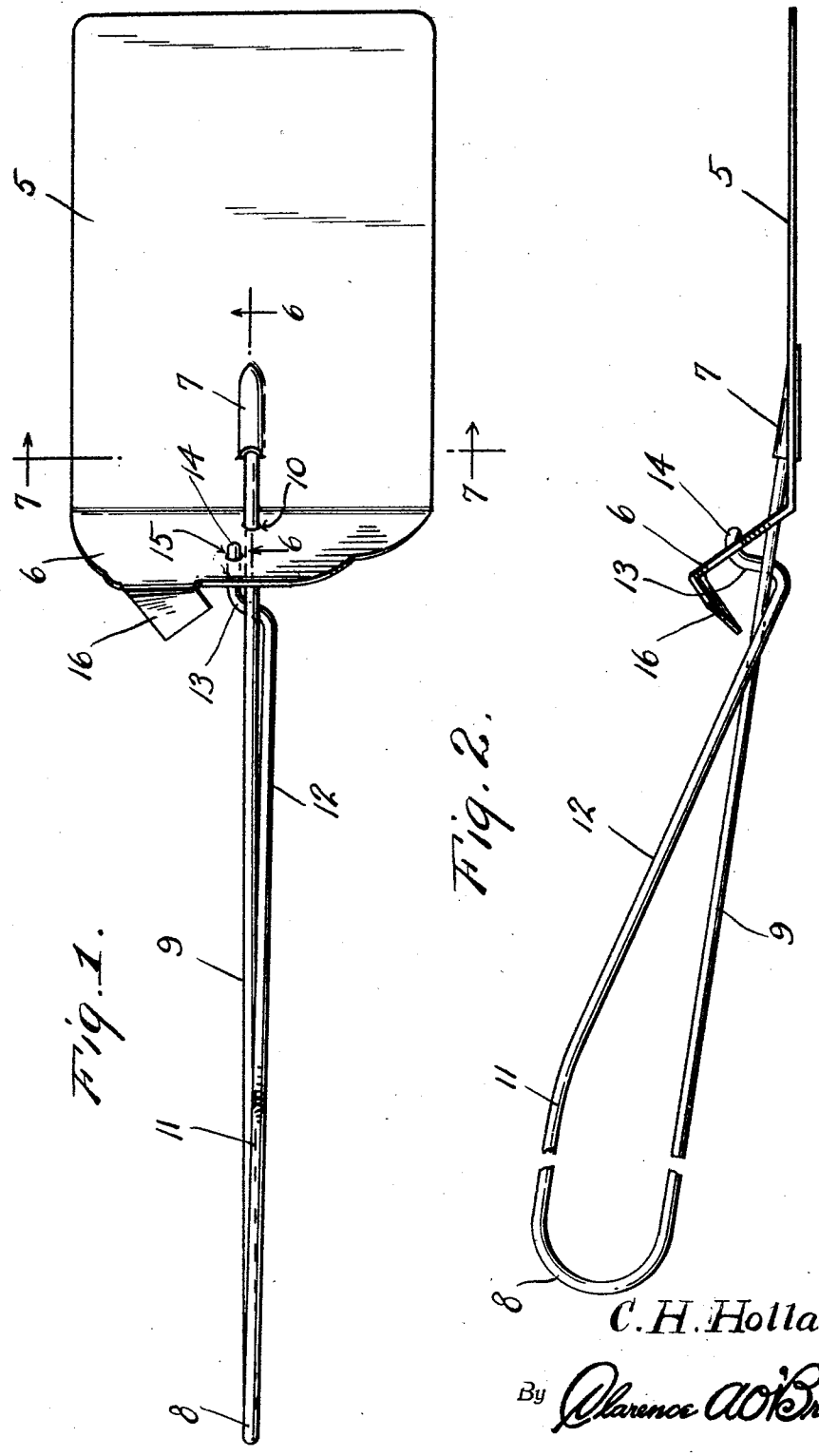
Inventor
C. H. Holland
By Clarence A. O'Brien
Attorney Oct. 20, 1931.                C. H. HOLLAND                1,828,187
                                CAKE TURNER
             Original Filed Sept. 25, 1929        2 Sheets-Sheet 2
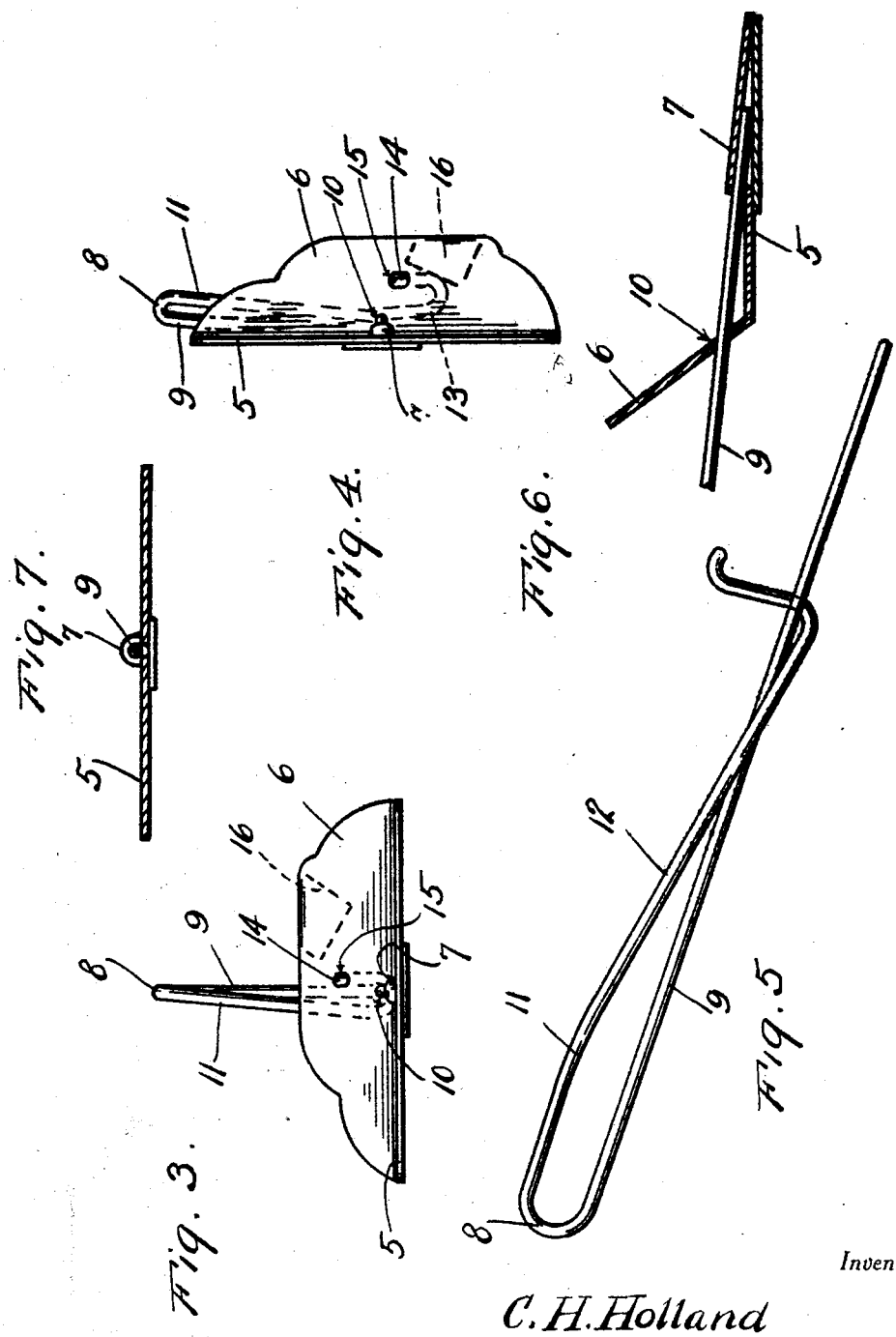
Inventor
C. H. Holland
By Clarence A. O'Brien
                                    Attorney Patented Oct. 20, 1931

1,828,187

UNITED STATES PATENT OFFICE

CLINTON HERBERT HOLLAND, OF GROVELAND, MASSACHUSETTS

CAKE TURNER

Application filed September 25, 1929, Serial No. 395,065. Renewed April 20, 1931.

This invention relates broadly to kitchen appliances, and has more particular reference to a cake turner.

The primary object of the invention is to provide an improved cake turner, which will obviate the necessity of one using the cake turner, to flip his wrist when using the turner, as in turning over frying eggs, meat, and other articles of food, which during the process of cooking must be turned, from one side to the other.

Another very important object of this invention is to provide an improved cake turner, whereby the handle of the same may be gripped in the hand of the operator, and the blade carried by the handle being rotatably mounted thereon, and operatively connected with the handle, whereby upon a slight pressure of the thumb of the user, the blade may be rotated upon the handle for movement to a substantially vertical position, whereby the material on the blade may be readily returned to the frying pan or cooking utensil in an overturned position.

A still further object of the invention is to provide a cake turner of the character above mentioned which will be simple in construction, thoroughly reliable, practical, efficient in use and operation, is inexpensive, may be retailed at a nominal cost, and is otherwise well adapted for the purpose designed.

Other objects and advantages of the invention will become apparent from the study of the following description taken in connection with the accompanying drawings, wherein:

Figure 1 is a top plan view of a cake turner embodying the features of the present invention.

Fig. 2 is a side elevation thereof.

Fig. 3 is an end elevation of the cake turner when the blade is in a substantially horizontal position.

Fig. 4 is a similar view showing the blade of the turner in a vertical or turning position.

Figure 5 is a side elevational view of the handle per se.

Fig. 6 is a longitudinal detail sectional view taken substantially on the line 6—6 of Fig. 1.

Figure 7 is a transverse sectional view, taken substantially on the line 7—7 of Figure 1.

With reference more in detail to the drawings, it will be seen that my improved cake turner comprises a substantially elongated relatively flat blade 5, which blade at its rear end merges into an upwardly and rearwardly extending rear wall 6. The blade 5 intermediate the longitudinal edges thereof, adjacent the rear wall 6, has formed thereon a longitudinally extending socket 7.

As shown to advantage in Figs. 2 and 6, the socket 7 inclines upwardly and rearwardly and is opened at its rear end. A substantially U-shaped handle 8 is preferably formed from a single strand of wire and comprises the relatively straight leg 9, one end of which is passed thru an opening 10 in the lower portion of the rear wall 6, and in longitudinal alinement with the socket 7, the free end of the leg 9 being receivable in said socket 7.

The end of the leg 9 is relatively loose within the socket 7. The other leg of the U-shaped handle, is bent adjacent the bight of the handle, to provide a downwardly and forwardly extending portion 12, which portion 12 adjacent its lower end is extended across the leg 9, as shown to advantage in Fig. 2.

The portion 12 of the leg merges into a substantially right-angularly disposed lateral extension 13, which extension 13 in turn merges into a hook 14. The hook 14 is receivable in an opening 15 formed in the rear wall 6 of the blade 5, adjacent the upper edge of the blade, and a little to one side of the opening 10.

Inwardly from one end thereof, the upper edge of the rear wall 6 merges into an angularly disposed tongue or stop 16 which stop or tongue projects toward the handle 8, said tongue 16 is disposed relative to the leg member 9 of the handle 8 so that the lateral extension 13 and hook end 14 thereof, is receivable into the opening 15 between said tongue and said handle leg 9.

In actual practice, it will be seen that the cake turner has the U-shaped handle thereof adapted to be gripped in the hand of the operator, preferably being held lightly in the hand of the operator, when the turner is manipulated, for scooping up an article of food which is to be turned, that is, when the article is to be again disposed in the pan or upon the griddle may be so disposed thereon in the same place it formerly occupied but with the other side up as in the case of frying eggs, meat or the like.

For so turning the eggs or other article now being supported on the blade 5 the operator with his thumb may press downwardly with his thumb on the downwardly inclined portion 12 of the leg 11, which will obviously exert a pressure on the blade 5, whereby the blade will be rotated upon the leg 9 of the handle to assume a vertical position, as shown in Fig. 4, whereby the article carried on the blade will be slipped therefrom to fall within the frying pan or other cooking utensil.

Manifestly, pressure being released on the portion 12 of the handle leg 11, due to its resiliency, the portion 12 will again spring to its former position or to that position shown in Fig. 2, thus rotating the blade 5 in a reverse direction, so that when the lateral extension 13 abuts the adjacent portion of the handle leg member 9, said blade 5 will again be disposed in a horizontal position or that position shown to advantage in Fig. 1.

When the portion 12 of the handle leg 11 has been depressed for rotating the blade for moving the same to the position shown in Fig. 4, the tongue or stop 16 will strike against the upper portion of the lateral extension 13 to limit the movement of the blade 5, when the blade assumes a substantially vertical position, thus preventing further rotation of the blade 5 upon the handle.

It is believed that from a study of the foregoing description, taken in connection with the accompanying drawings, a clear understanding of the construction and operation of the device will be had, and that it is apparent with the handle 8 and blade 5 being constructed in this manner, when desired the handle may be readily removed from out of engagement with the blade 5 by merely drawing the end of the handle leg 9 from the socket 7 and through the opening 10, while the hooked end 14 can be as readily withdrawn from the opening 15.

Thus it will be appreciated, that such disconnection of the handle from the blade will permit of a thorough cleaning of the blade, and also when the parts are so separated, may be readily stored in a comparatively small space.

Even though I have herein shown and described the preferred embodiment of my invention, it is to be understood that I do not wish to limit myself to the specific details of construction, as herein recited and illustrated, but that the invention is susceptible to certain changes in the combination, arrangement, and construction of the various elements, in addition, the invention being susceptible to changes in the materials used, in size, and in shape, as fully coming within the spirit of the invention as herein described, and the scope of the appended claims.

Having thus described my invention, what I claim as new is:—

1. A cake turner comprising a blade, said blade being provided at the rear end thereof, with a longitudinally extending socket, a substantially U-shaped handle, said handle having one leg thereof at its free end receivable in said socket, and the other leg of said handle adapted to engage said blade adjacent the rear end of said blade, whereby the said other leg of said U-shaped handle may be moved for rotating the blade about the axis of the first mentioned leg of said handle, and said blade having formed thereon and disposed at an angle thereto a stop member adapted to engage the said other leg of said handle when said blade is rotated, for limiting the rotary movement of said blade.

2. A cake turner comprising a blade, having an upwardly and rearwardly inclined wall formed thereon, said blade having a socket formed therein adjacent said wall, a substantially U-shaped spring handle for said blade, said U-shaped handle having the free end of one leg thereof adapted to extend through said wall for reception into said socket, said handle having the other leg thereof adjacent its free end bent about the first-mentioned leg of said handle rearwardly of said wall, and the free end of the second-mentioned leg of said handle terminating in a hook adapted to extend through an opening formed in said rear wall, as and for the purpose specified.

3. A cake turner comprising a blade having an upwardly and rearwardly inclined wall formed thereon, said blade having a socket formed therein adjacent said wall, a substantially U-shaped spring handle for said blade, said U-shaped handle having the free end of one leg thereof adapted to extend through said wall for reception into said socket, said handle having the other leg thereof adjacent its free end bent about the first mentioned leg of said handle rearwardly of said wall, the free end of the second-mentioned leg of said handle terminating in a hook adapted to extend through an opening formed in said rear wall, and said rear wall at its upper edge merging into an angularly disposed stop member adapted to engage the second mentioned leg of said U-shaped handle for limiting the movement of said blade, whereby said blade may be disposed in a substantially vertical position upon the application of pressure to the legs of said U-shaped handle.

4. A cake turner comprising a blade having an upwardly and rearwardly inclined wall formed integrally therewith, said blade having a socket formed therein adjacent said wall, a U-shaped handle for said blade, said handle comprising a pair of legs of varying length, the longer of said legs having its free end received in said socket, and the shorter of said legs terminating in a hook, and said rear wall provided with an opening for receiving said hook.

In testimony whereof I affix my signature.

CLINTON HERBERT HOLLAND.